(12) United States Patent
Fujiki et al.

(10) Patent No.: US 12,391,269 B2
(45) Date of Patent: Aug. 19, 2025

(54) APPARATUS AND METHOD FOR MESSAGE NOTIFICATION

(71) Applicants: TOYOTA JIDOSHA KABUSHIKI KAISHA, Toyota (JP); DENSO CORPORATION, Kariya (JP)

(72) Inventors: Takuya Fujiki, Tokyo-to (JP); Kenichiro Aoki, Machida (JP); Ryusuke Kuroda, Tokyo-to (JP); Osamu Ozaki, Mishima (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 234 days.

(21) Appl. No.: 18/187,200

(22) Filed: Mar. 21, 2023

(65) Prior Publication Data
US 2023/0373509 A1 Nov. 23, 2023

(30) Foreign Application Priority Data

May 17, 2022 (JP) .................................. 2022-081098

(51) Int. Cl.
*B60W 50/14* (2020.01)
*B60Q 9/00* (2006.01)
*B60W 60/00* (2020.01)

(52) U.S. Cl.
CPC ............. *B60W 50/14* (2013.01); *B60Q 9/00* (2013.01); *B60W 60/00* (2020.02); *B60W 2050/146* (2013.01)

(58) Field of Classification Search
None
See application file for complete search history.

(56) References Cited

U.S. PATENT DOCUMENTS

| | | | | |
|---|---|---|---|---|
| 2010/0253526 A1* | 10/2010 | Szczerba | ............... | G08B 21/06 340/576 |
| 2018/0148071 A1* | 5/2018 | Kim | ................. | B60W 60/0059 |
| 2019/0070963 A1* | 3/2019 | Jang | ....................... | B60K 35/00 |
| 2019/0256106 A1* | 8/2019 | Lee | ....................... | B60W 50/14 |
| 2021/0188289 A1* | 6/2021 | Oba | ......................... | G08G 1/00 |

FOREIGN PATENT DOCUMENTS

| | | | | |
|---|---|---|---|---|
| JP | 11-099879 A | 4/1999 | | |
| JP | 2007-024854 A | 2/2007 | | |
| JP | 2014-229997 A | 12/2014 | | |
| JP | 2015-003544 A | 1/2015 | | |
| JP | 2017-107502 A | 6/2017 | | |
| JP | 2018-124097 A | 8/2018 | | |
| JP | 2019-059245 A | 4/2019 | | |
| JP | 2019160081 A * | 9/2019 | ............ | B60K 35/00 |
| WO | WO-2021186186 A1 * | 9/2021 | ............ | B60W 40/09 |

* cited by examiner

*Primary Examiner* — Justin S Lee
(74) *Attorney, Agent, or Firm* — Sughrue Mion, PLLC (57) ABSTRACT

An apparatus for message notification displays a message to be known to a driver of a vehicle on a display disposed in front of a driver's seat on which the driver is sitting, when a change in environment around the vehicle causing the driver to turn his/her attention forward, an action of the vehicle that the driver can sense, or operation by the driver of a vehicle-mounted device in a front area of the vehicle is detected, in the case where travel of the vehicle is controlled in autonomous driving mode in which driving operation by the driver is unnecessary, and where a looking direction of the driver is not a direction related to the driving operation.

18 Claims, 4 Drawing Sheets

APPARATUS AND METHOD FOR MESSAGE NOTIFICATION

FIELD

The present disclosure relates to an apparatus for notifying a driver of a vehicle of messages.

BACKGROUND

An apparatus for message notification mounted on a vehicle notifies a driver of a vehicle of various messages. Japanese Unexamined Patent Publication No. 2019-059245 describes a head-up display that determines display content and display position, based on attribute information of a driver of a vehicle, on an individual driver basis, and that displays a virtual image by projecting image light onto a projection-target member disposed in front of the driver.

SUMMARY

A driver of a vehicle traveling in autonomous driving mode in which driving operation by the driver is unnecessary, in particular, at level 3 of autonomous driving, in which the driver need not be alert, does not necessarily look ahead of the vehicle carefully. Thus, even when a message appears on a display disposed in front of the driver, the driver may not always react to the message appropriately.

It is an object of the present disclosure to provide an apparatus that can notify a driver of a message appropriately, even in a vehicle controlled to travel in autonomous driving mode.

An apparatus for message notification according to the present disclosure includes a processor configured to detect a looking direction of a driver of a vehicle; and display a message to be known to the driver on a display disposed in front of a driver's seat on which the driver is sitting, when a change in environment around the vehicle causing the driver to turn his/her attention forward, an action of the vehicle that the driver can sense, or operation by the driver of a vehicle-mounted device in front of the driver's seat is detected, in the case where travel of the vehicle is controlled in autonomous driving mode in which driving operation by the driver is unnecessary, and where the looking direction of the driver is not a direction related to the driving operation.

In the apparatus of the present disclosure, the processor is preferably further configured to identify the message to be known to the driver in response to a change in environment in the interior of the vehicle or a change in environment around the vehicle that does not cause the driver to turn his/her attention forward.

In the apparatus of the present disclosure, the processor, at displaying the message, preferably display the message on the display when it is further detected that the looking direction of the driver is a direction related to the driving operation within a predetermined time of detection of the change in environment, the action of the vehicle, or the operation by the driver.

In the apparatus of the present disclosure, the change in environment preferably includes at least one of a change in illuminance around the vehicle, a change in atmospheric pressure around the vehicle, or a change in distance from the vehicle to a leading vehicle traveling ahead of the vehicle.

In the apparatus according to the present disclosure, the action of the vehicle preferably includes at least one of a start or stop of operation of windshield wipers, turning-on or turning-off of headlights, or a stop or deceleration of the vehicle.

In the apparatus according to the present disclosure, the operation of the vehicle-mounted device preferably includes operation of at least one of a car navigation device, an audio device, or an air-conditioner.

A method for message notification of the present disclosure includes displaying a message to be known to a driver of a vehicle on a display disposed in front of a driver's seat on which the driver is sitting, when a change in environment around the vehicle causing the driver to turn his/her attention forward, an action of the vehicle that the driver can sense, or operation by the driver of a vehicle-mounted device in front of the driver's seat is detected, in the case where travel of the vehicle is controlled in autonomous driving mode in which driving operation by the driver is unnecessary, and where a looking direction of the driver is not a direction related to the driving operation.

The method according to the present disclosure preferably further includes identifying the message to be known to the driver in response to a change in environment in the interior of the vehicle or a change in environment around the vehicle that does not cause the driver to turn his/her attention forward.

In the method according to the present disclosure, the message is preferably displayed on the display when it is further detected that the looking direction of the driver is a direction related to the driving operation within a predetermined time of detection of the change in environment, the action of the vehicle, or the operation by the driver.

In the method according to the present disclosure, the change in environment preferably includes at least one of a change in illuminance around the vehicle, a change in atmospheric pressure around the vehicle, or a change in distance from the vehicle to a leading vehicle traveling ahead of the vehicle.

In the method according to the present disclosure, the action of the vehicle preferably includes at least one of a start or stop of operation of windshield wipers, turning-on or turning-off of headlights, or a stop or deceleration of the vehicle.

In the method according to the present disclosure, the operation of the vehicle-mounted device preferably includes operation of at least one of a car navigation device, an audio device, or an air-conditioner.

A computer program for message notification stored in a non-transitory computer-readable medium of the present disclosure causes a computer mounted on a vehicle to execute a process including displaying a message to be known to a driver of the vehicle on a display disposed in front of a driver's seat on which the driver is sitting, when a change in environment around the vehicle causing the driver to turn his/her attention forward, an action of the vehicle that the driver can sense, or operation by the driver of a vehicle-mounted device in front of the driver's seat is detected, in the case where travel of the vehicle is controlled in autonomous driving mode in which driving operation by the driver is unnecessary, and where a looking direction of the driver is not a direction related to the driving operation.

The computer program stored in the non-transitory computer-readable medium of the present disclosure preferably causes the computer to execute a process further including identifying the message to be known to the driver in response to a change in environment in the interior of the vehicle or a change in environment around the vehicle that does not cause the driver to turn his/her attention forward.

In the computer program stored in the non-transitory computer-readable medium of the present disclosure, the message is preferably displayed on the display when it is further detected that the looking direction of the driver is a direction related to the driving operation within a predetermined time of detection of the change in environment, the action of the vehicle, or the operation by the driver.

In the computer program stored in the non-transitory computer-readable medium of the present disclosure, the change in environment preferably includes at least one of a change in illuminance around the vehicle, a change in atmospheric pressure around the vehicle, or a change in distance from the vehicle to a leading vehicle traveling ahead of the vehicle.

In the computer program stored in the non-transitory computer-readable medium of the present disclosure, the action of the vehicle preferably includes at least one of a start or stop of operation of windshield wipers, turning-on or turning-off of headlights, or a stop or deceleration of the vehicle.

In the computer program stored in the non-transitory computer-readable medium of the present disclosure, the operation of the vehicle-mounted device preferably includes operation of at least one of a car navigation device, an audio device, or an air-conditioner.

The apparatus according to the present disclosure can notify a driver of a message appropriately, even in a vehicle controlled to travel in autonomous driving mode.

DESCRIPTION OF EMBODIMENTS

An apparatus that can notify a driver of a message appropriately, even in a vehicle controlled to travel in autonomous driving mode will now be described in detail with reference to the attached drawings. The apparatus determines whether travel of a vehicle is controlled in autonomous driving mode in which driving operation by the driver is unnecessary, and whether the looking direction of the driver is a direction related to the driving operation. In the case where travel of the vehicle is controlled in autonomous driving mode and where the looking direction of the driver is not a direction related to the driving operation, the apparatus further determines whether a change in environment around the vehicle causing the driver to turn his/her attention forward, an action of the vehicle that the driver can sense, or operation by the driver of a vehicle-mounted device in a front area of the vehicle is detected. When a change in environment, an action of the vehicle, or operation by the driver is detected, the apparatus displays a message to be known to the driver on a display disposed in front of a driver's seat on which the driver is sitting.

Figure 1:
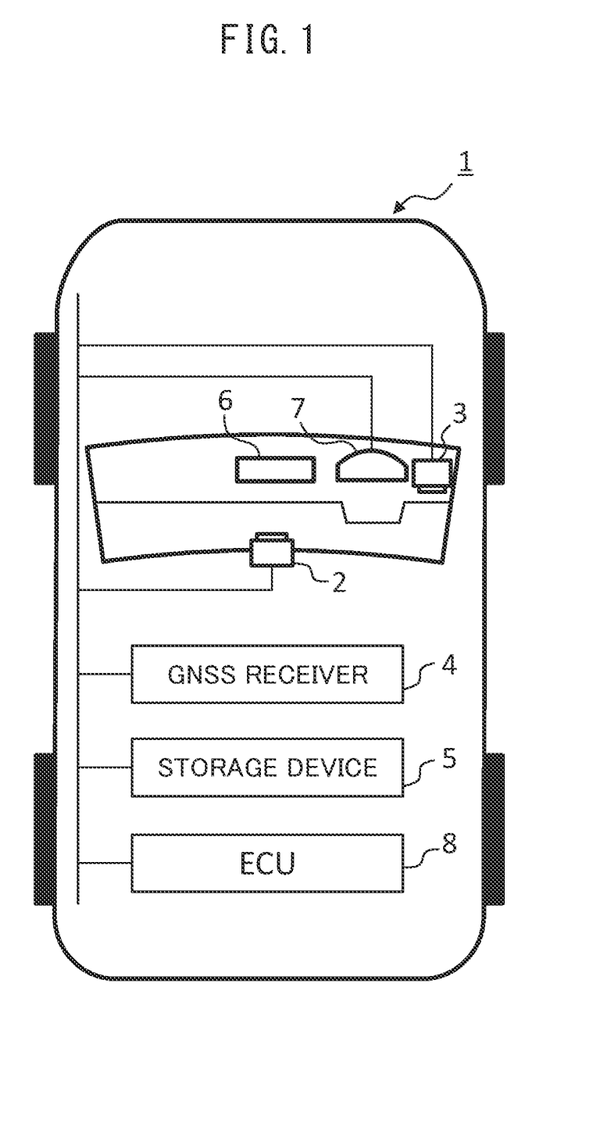
FIG. 1 schematically illustrates the configuration of a vehicle equipped with an apparatus for message notification.

FIG. 1 schematically illustrates the configuration of a vehicle equipped with the apparatus for message notification.

The vehicle 1 includes an environmental camera 2, a driver monitoring camera 3, a global navigation satellite system (GNSS) receiver 4, a storage device 5, a vehicle-mounted device 6, a meter display 7, and an electronic control unit (ECU) 8, which is an example of the apparatus for message notification. The environmental camera 2, the driver monitoring camera 3, the GNSS receiver 4, the storage device 5, the vehicle-mounted device 6, and the meter display 7 are communicably connected to the ECU 8 via an in-vehicle network conforming to a standard such as a controller area network.

The environmental camera 2 is an example of an environmental imaging unit for generating an environmental image representing the surroundings of the vehicle. The environmental camera 2 includes a two-dimensional detector constructed from an array of optoelectronic transducers, such as CCD or C-MOS, having sensitivity to visible light and a focusing optical system that forms an image of a target region on the two-dimensional detector. The environmental camera 2 is disposed, for example, in a front and upper area in the interior of the vehicle and oriented forward, takes a picture of the surroundings of the vehicle 1 through a windshield every predetermined capturing period (e.g., 1/30 to 1/10 seconds), and outputs environmental images representing the surroundings.

The driver monitoring camera 3 is an example of a driver imaging unit for generating a driver image representing the state of the head of the driver of the vehicle. The driver monitoring camera 3 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 3 is mounted, for example, in a front area in the interior of the vehicle and oriented toward the face of the driver sitting on the driver's seat. The driver monitoring camera 3 irradiates the driver with infrared light every predetermined capturing period (e.g., 1/30 to 1/10 seconds), and outputs images representing the driver's face.

The GNSS receiver 4 receives GNSS signals from GNSS satellites at predetermined intervals, and determines the position of the vehicle 1, based on the received GNSS signals. The GNSS receiver 4 outputs a positioning signal indicating the result of determination of the position of the vehicle 1 based on the GNSS signals, for example, to the ECU 8 via the in-vehicle network at predetermined intervals.

The storage device 5, which is an example of storage, includes, for example, a hard disk drive or a nonvolatile semiconductor memory. The storage device 5 stores map information including routes between locations in a predetermined area.

The vehicle-mounted device 6 is mounted in front of the driver's seat in the vehicle 1. The vehicle-mounted device 6 is an information processor including a communication interface, a touch screen display, a memory storing map information, and a processor, and has a navigation function. The vehicle-mounted device 6 searches for a route leading from the position of the vehicle 1 identified on the basis of a positioning signal obtain from the GNSS receiver 4 to a destination designated by operation of the touch screen display, and displays the route found by searching on the touch screen display.

The vehicle-mounted device 6 only has to be disposed in front of the driver's seat and operated by the driver, and may be a device having a function other than the navigation function, such as an audio device or an air-conditioner.

The meter display 7, which is an example of the display unit, includes, for example, a liquid crystal display. The meter display 7 is disposed in front of the driver's seat in the vehicle 1, and displays a message to be known to the driver according to a signal received from the ECU 8 via the in-vehicle network.

The ECU 8 includes a communication interface, a memory, and a processor. The ECU 8 detects an object in an area around the vehicle 1 from an environmental image received from the environmental camera 2, outputs control signals to a travel mechanism (not illustrated) of the vehicle 1, including an engine or a motor, brakes, and steering, so as to keep a predetermined distance from the detected object, and thereby executes autonomous driving control of the vehicle 1. In addition, the ECU 8 detects the looking direction of the driver from a driver image received from the driver monitoring camera 3 via the communication interface. The ECU 8 further detects a change in surrounding environment, an action of the vehicle 1, and the driver's operation of the vehicle-mounted device 6. The ECU 8 then displays a message to be known to the driver on the meter display 7.

Figure 2:
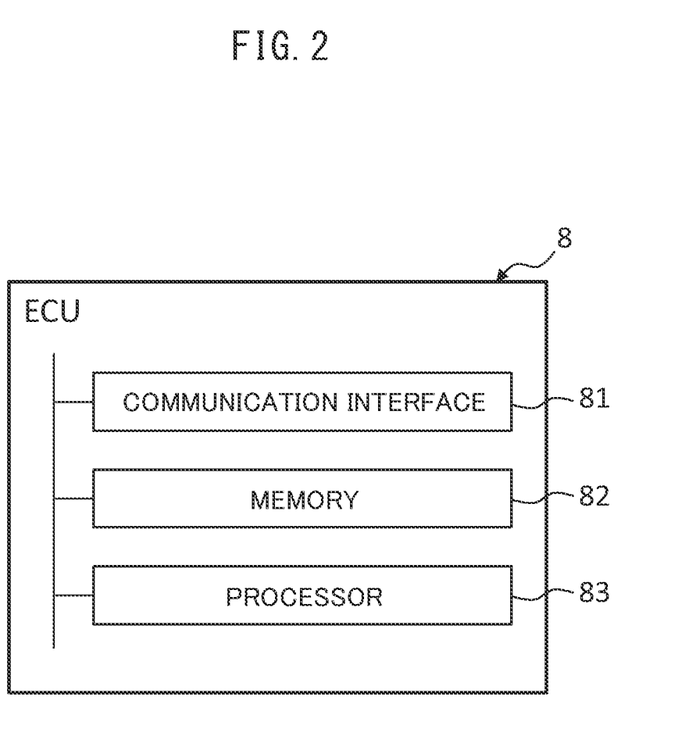
FIG. 2 schematically illustrates the hardware of an ECU.

FIG. 2 schematically illustrates the hardware of the ECU 8. The ECU 8 includes a communication interface 81, a memory 82, and a processor 83.

The communication interface 81, which is an example of a communication unit, includes a communication interface circuit for connecting the ECU 8 to the in-vehicle network. The communication interface 81 provides received data for the processor 83, and outputs data provided from the processor 83 to an external device.

The memory 82, which is an example of a storage unit, includes volatile and nonvolatile semiconductor memories. The memory 82 stores various types of data used for processing by the processor 83, such as a set of parameters for defining a neural network that operates as a classifier for detecting an object from an environmental image, templates representing pupils and corneal reflection images of light sources for detecting the looking direction of the driver by matching with a driver image, criteria for determining whether a change in surrounding environment is causing the driver to turn his/her attention forward, and criteria for determining whether an action of the vehicle is that the driver can sense. The memory 82 also stores various application programs, such as a message notification program for executing a message notification process.

The processor 83, which is an example of a control unit, includes one or more processors and a peripheral circuit thereof. The processor 83 may further include another operating circuit, such as a logic-arithmetic unit, an arithmetic unit, or a graphics processing unit.

Figure 3:
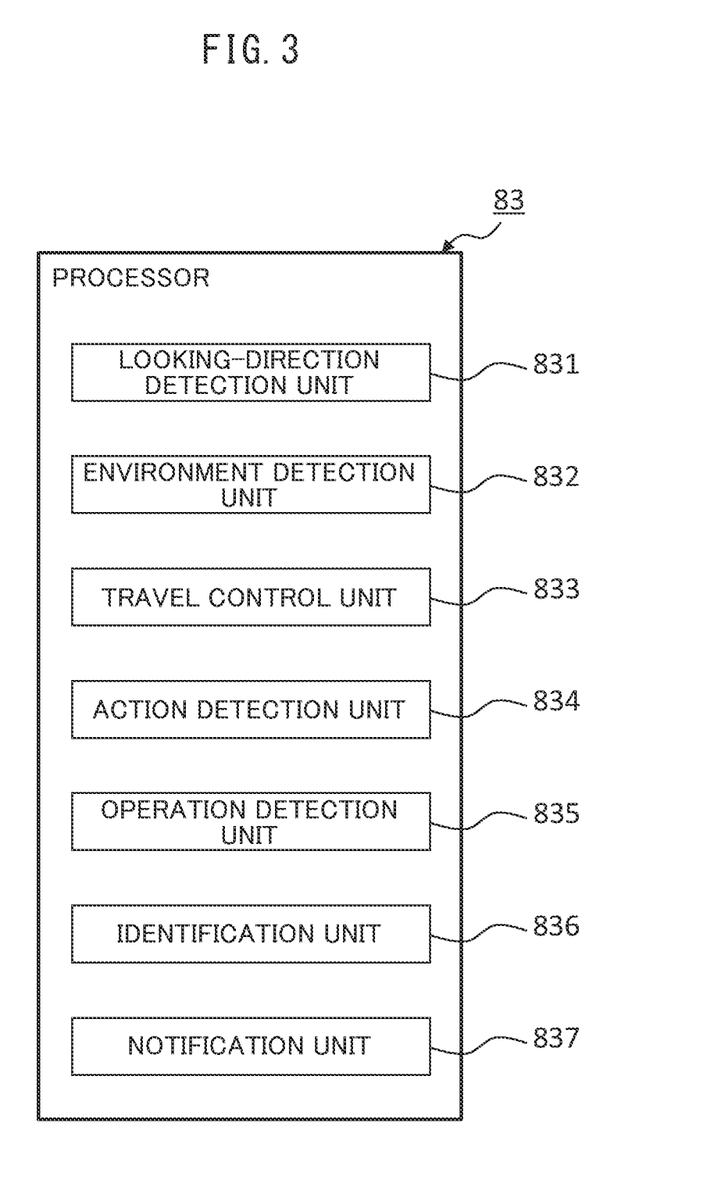
FIG. 3 is a functional block diagram of a processor included in the ECU.

FIG. 3 is a functional block diagram of the processor 83 included in the ECU 8.

As its functional blocks, the processor 83 of the ECU 8 includes a looking-direction detection unit 831, an environment detection unit 832, a travel control unit 833, an action detection unit 834, an operation detection unit 835, an identification unit 836, and a notification unit 837. These units included in the processor 83 are functional modules implemented by a computer program executed by the processor 83. The computer program for achieving the functions of the units of the processor 83 may be provided in a form recorded on a computer-readable portable storage medium, such as a semiconductor memory, a magnetic medium, or an optical medium. Alternatively, the units included in the processor 83 may be implemented in the ECU 8 as separate integrated circuits, microprocessors, or firmware.

The looking-direction detection unit 831 detects the looking direction of the driver from a driver image received from the driver monitoring camera 3 via the communication interface 81. For example, the looking-direction detection unit 831 detects pupils and corneal reflection images of the light source by template matching of the driver image with the templates representing pupils and corneal reflection images of light sources, and detects the looking direction, based on their positional relationship. The looking direction is expressed as a horizontal angle and a vertical angle between the travel direction of the vehicle 1 and the direction in which the driver is looking.

The environment detection unit 832 detects a change in environment around the vehicle 1.

As the environment around the vehicle 1, the environment detection unit 832 detects the distance from the vehicle 1 to a leading vehicle traveling ahead of the vehicle. In this case, the environment detection unit 832 identifies the position of a vehicle included in an environmental image by inputting the environmental image into a first classifier that has been trained to detect an object. The first classifier may be, for example, a convolutional neural network (CNN) including convolution layers connected in series from the input toward the output. A CNN that has been trained using inputted environmental images including vehicles as training data operates as the first classifier for identifying the position of a vehicle.

The environment detection unit 832 compares the width of the vehicle in the environmental image with that of a standard vehicle prestored in the memory 82 to detect the distance from the vehicle 1 to the leading vehicle.

As the environment around the vehicle 1, the environment detection unit 832 also detects illuminance around the vehicle 1. In this case, the environment detection unit 832 classifies each of the pixels included in an environmental image as a class representing an object corresponding to the pixel among multiple classes, by inputting the environmental image into a second classifier that has been trained to execute semantic segmentation. The second classifier may be a CNN that includes convolution layers connected in series from inputs toward outputs and that does not include a fully-connected layer. A CNN that has been trained using inputted environmental images whose pixels are classified into various classes, such as a vehicle, a road, and a sky, as training data operates as the second classifier for executing semantic segmentation.

The environment detection unit 832 estimates illuminance around the vehicle 1, using luminance of pixels classified as a road, as well as the aperture value and the exposure time at capturing the environmental image.

The environment detection unit 832 may use a classifier that classifies pixels of an environmental image into various classes and that identifies individual objects corresponding to the classes into which the pixels are classified, as the first and second classifiers.

As the environment around the vehicle 1, the environment detection unit 832 also detects atmospheric pressure around the vehicle 1, based on pressure information obtained from an atmospheric pressure sensor (not illustrated) mounted on the vehicle 1 and connected to the in-vehicle network.

The travel control unit 833 controls travel of the vehicle 1 in autonomous driving mode in which driving operation by the driver is unnecessary. The travel control unit 833 generates a trajectory such that the distance to any of the objects detected from an environmental image by the environment detection unit 832 will be kept not less than a predetermined distance, and outputs control signals to the travel mechanism (not illustrated) of the vehicle 1 so that the vehicle 1 travels along the trajectory. The travel mechanism includes, for example, an engine or a motor for powering the vehicle 1, brakes for decelerating the vehicle 1, and a steering mechanism for steering the vehicle 1.

The action detection unit 834 detects an action of the vehicle 1.

As an action of the vehicle 1, the action detection unit 834 detects, for example, a start or stop of operation of windshield wipers (not illustrated) mounted on the vehicle 1 and connected to the in-vehicle network. To detect an action of the windshield wipers, the action detection unit 834 obtains a wiper action signal for instructing the windshield wipers to act. The wiper action signal is transmitted to the windshield wipers in response to the driver's operation of a wiper switch or a raindrop signal outputted by a raindrop sensor (not illustrated) mounted on the vehicle 1.

As an action of the vehicle 1, the action detection unit 834 also detects, for example, turning-on or turning-off of headlights (not illustrated) mounted on the vehicle 1 and connected to the in-vehicle network. To detect an action of the headlights, the action detection unit 834 obtains a headlight action signal for instructing the headlights to act. The headlight action signal is transmitted to the headlights in response to the driver's operation of a headlight switch or an illuminance signal outputted by an illuminance sensor (not illustrated) mounted on the vehicle 1.

As an action of the vehicle 1, the action detection unit 834 also detects, for example, a stop or deceleration of the vehicle 1. To detect a stop or deceleration of the vehicle 1, the action detection unit 834 obtains a vehicle speed signal indicating the speed of the vehicle 1 from a vehicle speed sensor (not illustrated) mounted on the vehicle 1 and connected to the in-vehicle network. The speed of the vehicle 1 changes, depending on the driver's operation of a brake pedal or a control signal outputted to the travel mechanism by the travel control unit 833.

The operation detection unit 835 detects the driver's operation of the vehicle-mounted device 6. The operation detection unit 835 receives a device operation signal, via the in-vehicle network, transmitted by the vehicle-mounted device 6 in response to the driver's operation such as a touch on the touch screen display of the vehicle-mounted device 6, thereby detecting the driver's operation of the vehicle-mounted device 6. The operation detection unit 835 may detect an overlap between the vehicle-mounted device 6 and the driver's hand from a vehicle interior image outputted by a vehicle interior camera (not illustrated) disposed to take pictures of the vehicle-mounted device 6, thereby detecting the driver's operation of the vehicle-mounted device 6. In this case, the vehicle-mounted device 6 need not be connected to the in-vehicle network.

The identification unit 836 identifies a message to be known to the driver in response to a change in environment in the interior of the vehicle 1 or a change in environment around the vehicle 1 that does not cause the driver to turn his/her attention forward.

The identification unit 836 receives a hygrothermal signal indicating the temperature and humidity in the interior of the vehicle 1 from an in-vehicle hygrothermal sensor (not illustrated) provided in the vehicle interior and connected to the in-vehicle network. When a change in environment in the interior of the vehicle corresponds to an in-vehicle environmental change pattern stored in the memory 82, the identification unit 836 identifies a message associated with the in-vehicle environmental change pattern (e.g., "Wipe the fogginess from the windshield").

In addition, the identification unit 836 obtains traffic information on the state of traffic on a travel route ahead of the current position from a traffic information receiver (not illustrated) that obtains traffic information via a beacon placed on a road or via FM multiplex broadcasting. When a change in the state of traffic ahead corresponds to a traffic-state change pattern stored in the memory 82, the identification unit 836 identifies a message associated with the traffic-state change pattern (e.g., "Traffic is backed up ahead"). A change in the state of traffic ahead, which cannot be directly perceived by the driver, corresponds to a change in surrounding environment that does not cause the driver to turn his/her attention forward.

In addition, when the current position of the vehicle 1 indicated by a positioning signal obtained from the GNSS receiver 4 becomes within a predetermined distance of the end point of autonomous driving, the identification unit 836 identifies a message associated with the approach to the end point of autonomous driving (e.g., "Autonomous driving will soon finish"). The end point of autonomous driving cannot be directly perceived by the driver, and thus the approach thereto corresponds to a change in surrounding environment that does not cause the driver to turn his/her attention forward.

The notification unit 837 displays the message to be known to the driver identified by the identification unit 836 on the meter display 7 when all of the following conditions are satisfied.

(Condition 1) Travel of the vehicle 1 is controlled in autonomous driving mode.

The notification unit 837 inquires of the travel control unit 833 to determine whether travel of the vehicle 1 is controlled in autonomous driving mode.

(Condition 2) The looking direction of the driver is not a direction related to the driving operation (eyes-off).

The direction related to the driving operation refers to a direction in which the driver is supposed to look during the driving operation, e.g., a direction within ±15 degrees of the vertical and ±45 degrees of the horizontal with respect to the travel direction of the vehicle 1, and corresponds to a forward direction with respect to the driver sitting on the driver's seat. The notification unit 837 obtains the looking direction of the driver from the looking-direction detection unit 831, and determines whether the driver is in an eyes-off state.

(Condition 3) At least one of the following conditions 3-1 to 3-3 is satisfied.

(Condition 3-1) A change in environment causing the driver to turn his/her attention forward is detected.

The memory 82 stores a variance threshold for determining whether a change in surrounding environment causes the driver to turn his/her attention forward, for each type of surrounding environment. The notification unit 837 obtains time-series values of the illuminance, atmospheric pressure, and distance to a leading vehicle from the environment detection unit 832 as the surrounding environment. When the difference between a past value and a current value is greater than the variance threshold, the notification unit 837 detects a change in environment causing the driver to turn his/her attention forward. The past value may be a value at the latest past time in the time-series, or a representative value (e.g., an arithmetic mean) of values in a predetermined past period including the latest past time.

(Condition 3-2) An action of the vehicle 1 that the driver can sense is detected.

The memory 82 stores patterns of actions of the vehicle 1 that the driver is supposed to be able to sense. The notification unit 837 obtains information on an action of the vehicle 1 from the action detection unit 834. When the obtained information indicates an action corresponding to one of the patterns of actions stored in the memory 82, the notification unit 837 detects an action of the vehicle 1 that the driver can sense.

(Condition 3-3) The driver's operation of the vehicle-mounted device 6 is detected.

The notification unit 837 obtains the driver's operation of the vehicle-mounted device 6 detected by the operation detection unit 835.

Thus the message identified by the identification unit 836 and displayed by the notification unit 837 on the meter display 7 is not directly related to the events detected in conditions 3-1 to 3-3 above. The identification unit 836 can identify a message independently of detection of these events by the notification unit 837.

The notification unit 837 may display the message on the meter display 7 when the following condition 4 is satisfied in addition to condition 3 above.

(Condition 4) It is detected that the looking direction of the driver is a direction related to the driving operation within a predetermined time of satisfaction of condition 3.

Figure 4:
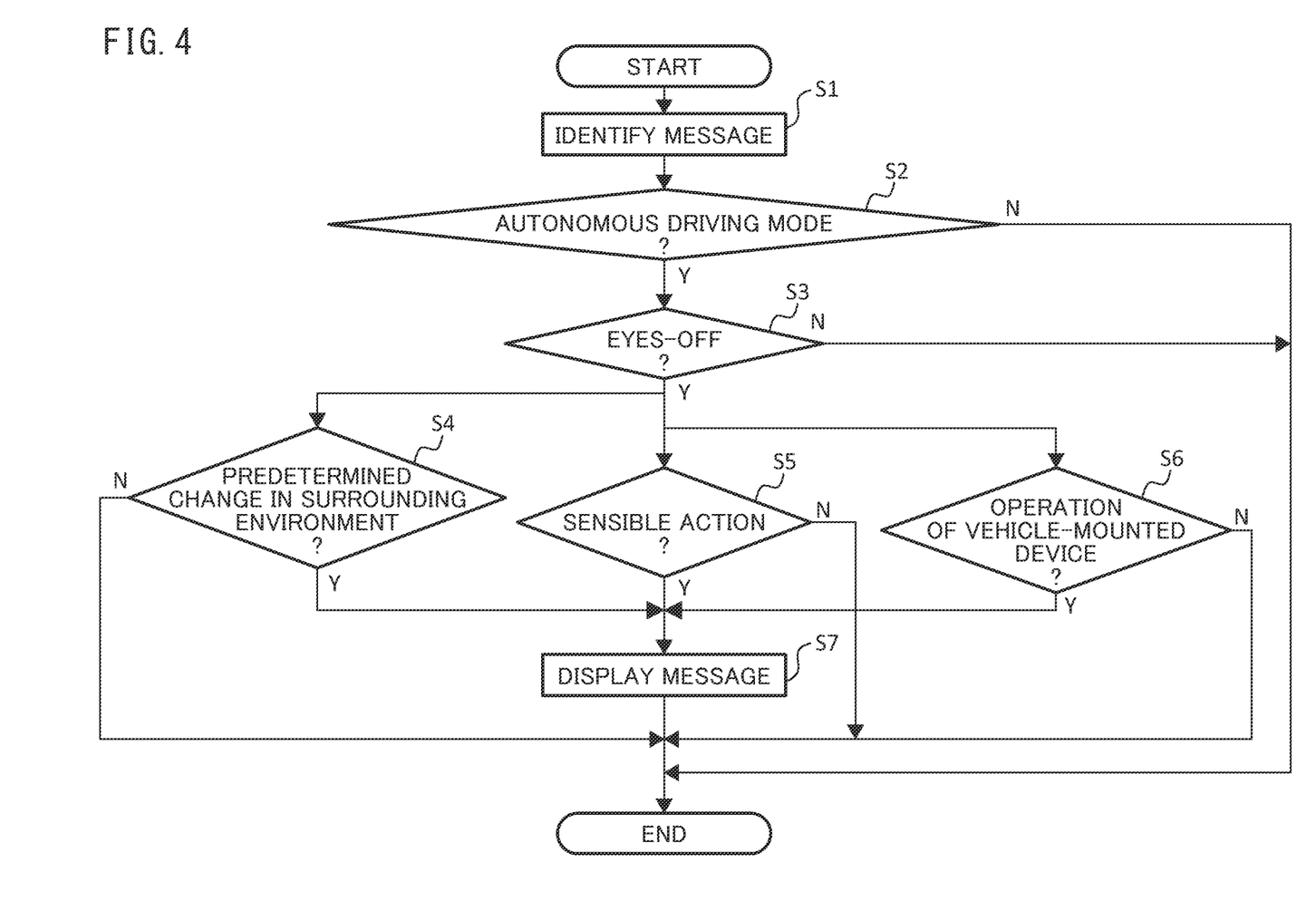
FIG. 4 is a flowchart of a message notification process.

FIG. 4 is a flowchart of a message notification process. The ECU 8 repeats the message notification process at predetermined intervals (e.g., interval of 1/10 seconds) during travel of the vehicle 1.

First, the identification unit 836 of the ECU 8 identifies a message to be known to the driver (step S1).

Next, the notification unit 837 of the ECU 8 determines whether travel of the vehicle 1 is controlled in autonomous driving mode (step S2). When it is determined that travel of the vehicle 1 is not controlled in autonomous driving mode (No in step S2), the ECU 8 terminates the message notification process.

When it is determined that travel of the vehicle 1 is controlled in autonomous driving mode (Yes in step S2), the notification unit 837 determines whether the driver is in an eyes-off state (step S3). When it is determined that the driver is not in an eyes-off state (No in step S3), the ECU 8 terminates the message notification process.

When it is determined that the driver is in an eyes-off state (Yes in step S3), the notification unit 837 determines whether a change in environment causing the driver to turn his/her attention forward is detected (step S4). When no change in environment causing the driver to turn his/her attention forward is detected (No in step S4), the ECU 8 terminates the message notification process.

When it is determined that driver is in an eyes-off state (Yes in step S3), the notification unit 837 further determines whether an action of the vehicle 1 that the driver can sense is detected (step S5). When no action of the vehicle 1 that the driver can sense is detected (No in step S5), the ECU 8 terminates the message notification process.

When it is determined that the driver is in an eyes-off state (Yes in step S3), the notification unit 837 further determines whether the driver's operation of the vehicle-mounted device 6 is detected (step S6). When the driver's operation of the vehicle-mounted device 6 is not detected (No in step S6), the ECU 8 terminates the message notification process.

When a change in environment causing the driver to turn his/her attention forward is detected (Yes in step S4), when an action of the vehicle 1 that the driver can sense is detected (Yes in step S5), or when the driver's operation of the vehicle-mounted device 6 is detected (Yes in step S6), the notification unit 837 displays the message to be known to the driver on the meter display 7 (step S7), and terminates the message notification process.

By executing the message notification process in this way, the ECU 8 can notify a driver of a message appropriately, even in a vehicle controlled to travel in autonomous driving mode.

In the message notification process, identification of the message by the identification unit 836 (step S1) need not be executed first, and only has to be executed before display of the message (step S7).

When it is determined that the driver is not in an eyes-off state in the message notification process (No in step S2), the ECU 8 may cause the process to proceed to step S7, and the notification unit 837 may display the message to be known to the driver on the meter display 7.

The vehicle-mounted device 6 may include a display, on which the notification unit 837 may display the message to be known to the driver in step S7 of the message notification process. In other words, the vehicle-mounted device of which the driver's operation is detected and the display unit on which the message to be known to the driver is displayed need not be different devices.

Note that those skilled in the art can make various changes, substitutions, and modifications without departing from the spirit and scope of the present disclosure.

What is claimed is:

1. An apparatus for message notification, comprising a processor configured to:
   detect a looking direction of a driver of a vehicle;
   determine whether travel of the vehicle is being controlled in autonomous driving mode in which driving operation by the driver is unnecessary;
   based on a determination that the vehicle is being controlled in autonomous driving mode, determine whether the looking direction of the driver is in a direction that is not related to the driving operation;
   based on a determination that the looking direction of the driver is in a direction that is not related to the driving operation:
      determine whether a change in environment around the vehicle causing the driver to turn his/her attention forward is detected,
      determine whether an action of the vehicle that the driver can sense is detected, and
      determine whether an operation by the driver of a vehicle-mounted device in front of the driver's seat is detected; and
   display a message to be known to the driver on a display disposed in front of a driver's seat on which the driver is sitting when at least one of a change in environment around the vehicle causing the driver to turn his/her attention forward is detected, an action of the vehicle that the driver can sense is detected, or operation by the driver of a vehicle-mounted device in front of the driver's seat is detected.

2. The apparatus according to claim 1, wherein the processor is further configured to identify the message to be known to the driver in response to a change in environment in an interior of the vehicle or a change in environment around the vehicle that does not cause the driver to turn his/her attention forward.

3. The apparatus according to claim 1, wherein the processor displays the message on the display when it is further detected that the looking direction of the driver is a direction related to the driving operation within a predetermined time of detection of the change in environment, the action of the vehicle, or the operation by the driver.

4. The apparatus according to claim 1, wherein the change in environment includes at least one of a change in illuminance around the vehicle, a change in atmospheric pressure around the vehicle, or a change in distance from the vehicle to a leading vehicle traveling ahead of the vehicle.

5. The apparatus according to claim 1, wherein the action of the vehicle includes at least one of a start or stop of operation of windshield wipers, turning-on or turning-off of headlights, or a stop or deceleration of the vehicle.

6. The apparatus according to claim 1, wherein the operation of the vehicle-mounted device includes operation of at least one of a car navigation device, an audio device, or an air-conditioner.

7. A method for message notification, comprising:
detecting a looking direction of a driver of the vehicle;
determining whether travel of the vehicle is being controlled in autonomous driving mode in which driving operation by the driver is unnecessary;
determining, based on a determination that the vehicle is being controlled in autonomous driving mode, whether the looking direction of the driver is in a direction that is not related to the driving operation;
determining, based on a determination that the looking direction of the driver is in a direction that is not related to the driving operation,
whether a change in environment around the vehicle causing the driver to turn his/her attention forward is detected,
whether an action of the vehicle that the driver can sense is detected, and
whether an operation by the driver of a vehicle-mounted device in front of the driver's seat is detected; and
displaying a message to be known to a driver of a vehicle on a display disposed in front of a driver's seat on which the driver is sitting when at least one of a change in environment around the vehicle causing the driver to turn his/her attention forward is detected, an action of the vehicle that the driver can sense is detected, or operation by the driver of a vehicle-mounted device in front of the driver's seat is detected.

8. The method according to claim 7, further comprising identifying the message to be known to the driver in response to a change in environment in an interior of the vehicle or a change in environment around the vehicle that does not cause the driver to turn his/her attention forward.

9. The method according to claim 7, wherein the message is displayed on the display when it is further detected that the looking direction of the driver is a direction related to the driving operation within a predetermined time of detection of the change in environment, the action of the vehicle, or the operation by the driver.

10. The method according to claim 7, wherein the change in environment includes at least one of a change in illuminance around the vehicle, a change in atmospheric pressure around the vehicle, or a change in distance from the vehicle to a leading vehicle traveling ahead of the vehicle.

11. The method according to claim 7, wherein the action of the vehicle includes at least one of a start or stop of operation of windshield wipers, turning-on or turning-off of headlights, or a stop or deceleration of the vehicle.

12. The method according to claim 7, wherein the operation of the vehicle-mounted device includes operation of at least one of a car navigation device, an audio device, or an air-conditioner.

13. A non-transitory computer-readable medium storing a computer program for message notification, the computer program causing a computer mounted on a vehicle to execute a process comprising:
detecting a looking direction of a driver of the vehicle;
determining whether travel of the vehicle is being controlled in autonomous driving mode in which driving operation by the driver is unnecessary;
determining, based on a determination that the vehicle is being controlled in autonomous driving mode, whether the looking direction of the driver is in a direction that is not related to the driving operation;
determining, based on a determination that the looking direction of the driver is in a direction that is not related to the driving operation,
whether a change in environment around the vehicle causing the driver to turn his/her attention forward is detected,
whether an action of the vehicle that the driver can sense is detected, and
whether an operation by the driver of a vehicle-mounted device in front of the driver's seat is detected; and
displaying a message to be known to a driver of the vehicle on a display disposed in front of a driver's seat on which the driver is sitting when at least one of a change in environment around the vehicle causing the driver to turn his/her attention forward is detected, an action of the vehicle that the driver can sense is detected, or operation by the driver of a vehicle-mounted device in front of the driver's seat is detected.

14. The non-transitory computer-readable medium according to claim 13, storing the computer program causing the computer to execute a process further comprising identifying the message to be known to the driver in response to a change in environment in an interior of the vehicle or a change in environment around the vehicle that does not cause the driver to turn his/her attention forward.

15. The non-transitory computer-readable medium according to claim 13, storing the computer program wherein the message is displayed on the display when it is further detected that the looking direction of the driver is a direction related to the driving operation within a predetermined time of detection of the change in environment, the action of the vehicle, or the operation by the driver.

16. The non-transitory computer-readable medium according to claim 13, storing the computer program wherein the change in environment includes at least one of a change in illuminance around the vehicle, a change in atmospheric pressure around the vehicle, or a change in distance from the vehicle to a leading vehicle traveling ahead of the vehicle.

17. The non-transitory computer-readable medium according to claim 13, storing the computer program wherein the action of the vehicle includes at least one of a start or stop of operation of windshield wipers, turning-on or turning-off of headlights, or a stop or deceleration of the vehicle.

18. The non-transitory computer-readable medium according to claim 13, storing the computer program wherein the operation of the vehicle-mounted device includes operation of at least one of a car navigation device, an audio device, or an air-conditioner.

* * * * *